(12) United States Patent
Watanabe et al.

(10) Patent No.: US 8,659,665 B2
(45) Date of Patent: *Feb. 25, 2014

(54) ELECTRONIC APPARATUS

(75) Inventors: Gaku Watanabe, Tokyo (JP); Shigeki Okauchi, Kodaira (JP); Hitoshi Nabetani, Yokohama (JP); Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 13/170,683

(22) Filed: Jun. 28, 2011

(65) Prior Publication Data

US 2011/0254965 A1    Oct. 20, 2011

Related U.S. Application Data

(60) Continuation of application No. 12/612,346, filed on Nov. 4, 2009, now Pat. No. 7,986,365, which is a division of application No. 10/375,323, filed on Feb. 27, 2003, now Pat. No. 7,630,004, which is a division of application No. 08/790,715, filed on Jan. 29, 1997, now Pat. No. 6,686,958.

(30) Foreign Application Priority Data

Jan. 29, 1996  (JP) ...................................... 8-013056
Jan. 29, 1996  (JP) ...................................... 8-013058
Jan. 31, 1996  (JP) ...................................... 8-015607

(51) Int. Cl.
*H04N 5/225*    (2006.01)

(52) U.S. Cl.
USPC ............... 348/207.1; 348/333.11; 348/333.12

(58) Field of Classification Search
USPC ............. 348/333.01, 333.02, 333.11, 333.12, 348/231.99, 231.1, 207.1
See application file for complete search history.

(56) References Cited

U.S. PATENT DOCUMENTS 5,808,672 A * 9/1998 Wakabayashi et al. .... 348/220.1
6,249,313 B1 * 6/2001 Nishi ......................... 348/231.9

* cited by examiner

*Primary Examiner* — Tuan Ho
(74) *Attorney, Agent, or Firm* — Cowan, Liebowitz & Latman, P.C.

(57) ABSTRACT

An electronic system comprising an image pickup unit 1, a computer 2, and communication terminals for connecting the unit and the computer, such as infrared communication ports 6, 10, a card slot 8, and serial communication terminals 5,9 wherein the necessary image data is allowed to be produced from the unit 1 and transmitted to the computer through the communication terminals. The computer communicates with the image pick up unit by examining the port of each communication means in order to recognize whether a connected unit is the image pickup unit or a foreign unit and to determine and store the communication speed for each communication port. The image data and memory space information is then automatically transmitted to the computer and displayed on a device connected to said computer.

54 Claims, 15 Drawing Sheets

ELECTRONIC APPARATUS

CROSS-REFERENCE TO RELATED APPLICATIONS

This application is a continuation of application Ser. No. 12/612,346, filed Nov. 4, 2009 now U.S. Pat. No. 7,986,365; which is a divisional of application Ser. No. 10/375,323, filed Feb. 27, 2003, now U.S. Pat. No. 7,630,004; which is a divisional of application Ser. No. 08/790,715, filed Jan. 29, 1997, now U.S. Pat. No. 6,686,958, the entire disclosures of which are hereby incorporated by reference.

BACKGROUND OF THE INVENTION

1. Field of the Invention

The present invention relates to an electronic apparatus for obtaining pickup image data utilizing an image pickup unit and a computer connected thereto.

2. Description of the Related Art

In an image pickup system for recording an image by means of an image pickup unit, and transferring such a recorded image to a computer equipped with a display device to utilize the image, the pickup unit therein has only a small amount of memory capacity. Therefore, every time image pickup of a predetermined frames of images is performed, it is necessary to transfer the recorded image to a computer having larger memory capacity.

In order to appreciate a photographed image, or perform other processings using a conventional image pickup system, the following operation was performed: (1) First, the picture image is transferred by a data transfer device. The user selects a transfer device to transfer the images by use of particular data communication software. There are several communication methods such as utilizing a memory card, a serial communication cable, and an infrared communication port. (2) Next, using an image processing software or an image summarized list, the image processing or image appreciation is performed.

There have been, however, several disadvantages in the conventional methods.

It is necessary for the user of the system, comparing the communication means included in the image pickup unit and the computer, to select an appropriate transfer method having the fastest image transfer rate, and also to utilize a communication software suitable for the communication.

In most cases, the user needed an excessive time consumption for data transfer operation, in spite of his purposes of image processing and appreciation.

Also recently, in parallel with the small-sized of the computers, even a computer of hand-held type has been developed. However, in comparison with the desk-top computer, a small-sized computer is restricted in the size of its recording medium, and therefore it is equipped with a card slot into which a PC card (PCMCIA/JEIDA) can be directly inserted, instead of a floppy disk drive. In most cases, the card slot is formed so that a FAX card or the like can be inserted therein so as to comply with various applications. Also recently, in Laid-open patent publication No. 7-121147, it is disclosed a card-type image pickup system capable of taking an image utilizing a camera lead installed on the end of the card, as shown in FIG. 16.

As shown in FIG. 16, the card-type image pickup system comprises a signal processing unit "a", a card connecter "b" mounted on one end of the unit "a", a support "c" mounted on the other end of the unit "a", and a camera head "d" rotatably supported on the support "c".

This pickup system is constructed so that it relies on the power source, CPU and memory associated with the computer, thereby being small-sized and of low cost.

The above-mentioned small-sized personal computer is one of those such as a sub-note or palm top personal computer, which is generally limited in its memory capacity, thereby only a less number of recording cards can be installed. In addition, since the program for operating such a card-type image pickup system is also stored in the computer, the program should be newly loaded, unless a specific personal computer is available. Also, if the number of slots for receiving the cards is not sufficient, each of a plurality of cards should be frequently replaced.

In order to record as many images as possible, normally the obtained image is compressed and recorded in a recording medium.

Namely, an obtained and digitally converted image signal is tentatively stored in a recording medium. Subsequently, the converted digital signal is derived from the recording medium and compressed by means of a particular circuit for compression, when such a circuit is specifically installed in the pickup system, and thereafter the compressed digital signal is again stored in the medium.

In most conventional cases, however, a great deal of time was required for compression of the image signal. Particularly, a long time for compression was required, in those cases that no specifical circuit is provided, that the ability of the CPU was not sufficient, or that the obtained image was of large sized. As a result of such elongated time for compression, the time period until the subsequent image pickup was again enabled was accordingly increased, and the user was often likely to lose his shutter chance.

SUMMARY OF THE INVENTION

In order to overcome the above disadvantage, an object of the present invention is to provide an image pickup system capable of implementing communication necessary between the pickup unit and the computer, without having the user conscious of the data transfer operation.

Further, the invention provides an electronic system powered by an external power source and producing image information to an external device, capable of being supplied with a sufficient memory capacity for the image information obtained by the image pickup unit.

The invention provides an electronic system including a card-shaped electronic device for enabling utilization of a large number of electronic instruments.

The invention provides a card-shaped electronic device which is connected an external device to enable the operation of such a device, capable of increasing the use of video apparatus such as a system video camera and a recording/reproducing apparatus, and reducing complexity of handling thereof, thereby to provide a video camera and recording/reproducing apparatus improved in their information transfer capability.

In addition, the invention is to provide an improvement in the process of image compression, in such a manner that the compression is performed in the period during which no image pickup operation takes place, such as when the main switch remains off by the user, or when determined there is no turn-on by the user for a predetermined period of time, thereby to reduce the time interval until the time when pickup of the next image is again enabled to start.

Also, the invention provides the process necessary for responding to the standby indication for image pickup such as a turn-on of the switch by the user during the period of image compression.

The invention further provides the means for informing each amount of uncompressed and compressed digital image signals to the user.

DETAILED DESCRIPTION OF THE PREFERRED EMBODIMENTS

An Embodiment of the invention is described with reference to FIGS. 1 to 8.

Image Pickup System

Figure 1:
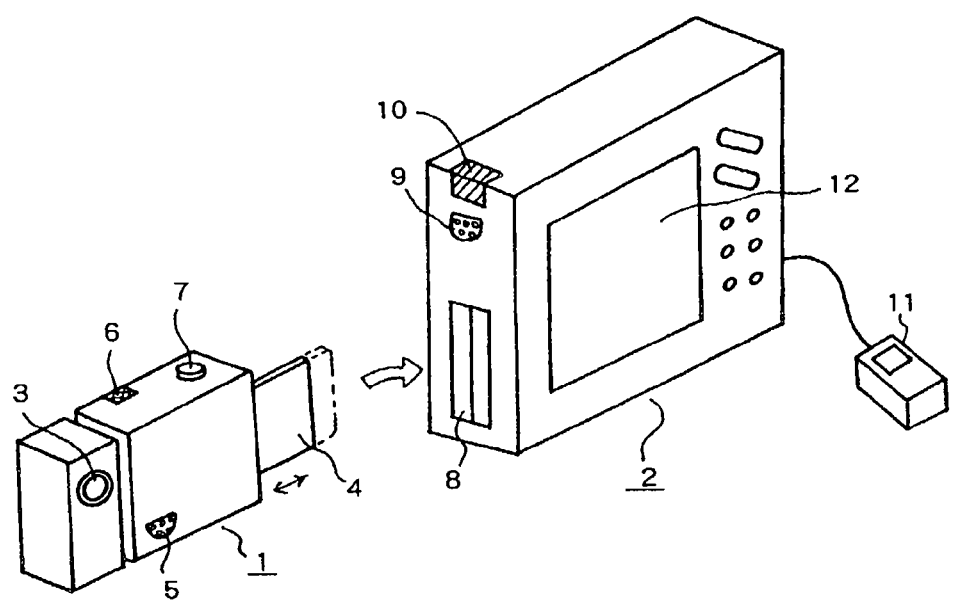
FIG. 1 is a perspective view of an embodiment of the invention.

FIG. 1 shows a summary view of an image pickup unit 1 and a computer 2.

The system comprises an image pickup unit 1 and a computer 2.

The pickup unit 1 includes a lens 3, a card socket 4 capable of being enclosed within a main body, a serial communication terminal 5, an infrared communication port 6, and a release button 7, and is capable of recording a predetermined frames of obtained images in a memory equipped therein.

The computer 2 includes a card slot 8, a serial communication terminal 9, an infrared communication port 10, an input device 11, and a display screen 12.

When an operator of the system wishes to recognize an obtained image, or to store the image data existing in the memory of pickup unit 1 into the memory device of computer 2, it is necessary to transfer the data from the memory of unit 1 to the computer 2.

When the card socket 4 is, inserted into card slot 8, the computer 2 is enabled to recognize the pickup unit 1 as a memory card. A recognition data (tupple) necessary for such recognition is stored in the memory of the pickup unit 1.

It is also possible, without using a card, but using either the serial communication terminal 9, or infrared communication port 10, to implement transmission of data. Instead of the card socket 4 of the unit 1, another card-type device may be also inserted into the card slot 8.

Image Pick-Up Unit

Figure 2:
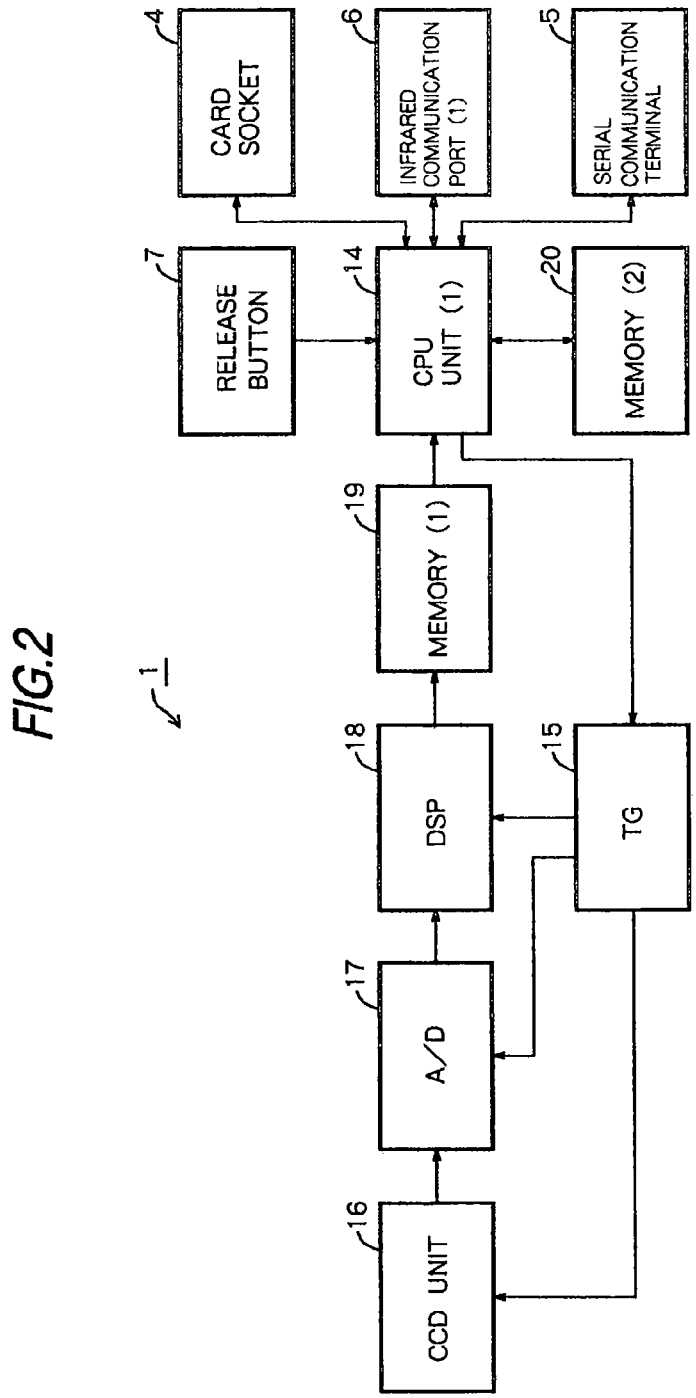
FIG. 2 is a block diagram of an image pickup unit of an embodiment.

FIG. 2 shows a block diagram of the image pickup unit, and the operation thereof is also described as follows.

A user of the pickup unit actuates the release button device 7 to conduct an image pickup operation, and a CPU unit (1) 14 transmits an instruction to a timing generator (TG) 15, which supplies a control signal to a CCD unit 16, an A/D converter 17 and a digital signal processing unit (DSP) 18. In response to the control signal, one frame of an image is recorded in a memory (1) 19, which is formed of a DRAM having a capacity for storing one frame of an image. After an image has been stored in memory (1), the CPU unit (1) compresses the image stored in memory (1), and the compressed image is stored in the memory (2), which is a flush memory capable of storing image data corresponding to about 50 images. The image data thus stored are permanently maintained even the power is disconnected.

The image pickup unit 1 includes a card socket device 4, an infrared communication port (1) denoted as 6, and a serial communication terminal (1) as 5, any of which serves as data transfer means. The card socket 4 can be directly inserted in a card slot 8, and is recognized by the computer having such a card socket as the card memory card. The image pickup unit 1 can utilize any of the three devices mentioned above as a data transfer means.

Computer

Figure 3:
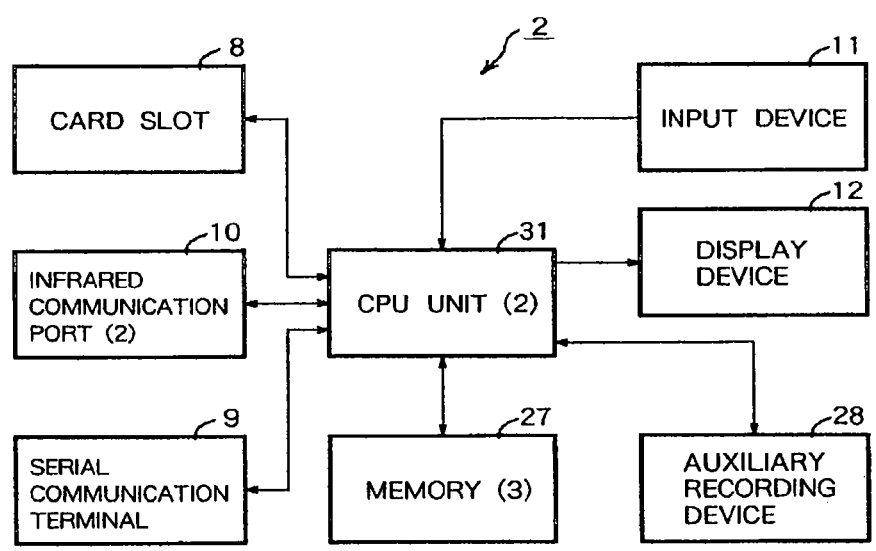
FIG. 3 is a block diagram of a computer of an embodiment.

FIG. 3 is a block diagram of the computer 2 for the image pickup system. Operation of the computer is described also referring to FIG. 3.

The computer 2 includes a card slot 8, an infrared communication port (2) 10, and a serial communication terminal 9. Any of the infrared communication port (2) 9 and serial communication terminal 10 is provided with a variable amount of communication rate, and can be controlled to have a most suitable communication rate according to the device connected thereto.

When the computer 2 and pickup unit 1 are interconnected to implement data transfer, either one of these communication methods is selected. When not all of the above methods is provided in either of both devices, a communication method is selected from the already available ones.

When an image data recorded in the pickup unit 1 is to be transferred to and stored in the computer 2, the data is actually stored in a memory (2) 27 or in an auxiliary recording device 28 within the computer 2, wherein the memory (3) is of a DRAM and the device 28 is of a hard disk having a large capacity. The user, of this pickup system is allowed to recognize the image data, referring the screen of a display device 12. Also, in order to operate the computer 2, the user utilizes the input device 11.

All of devices including the card slot 8, infrared communication port 10, serial communication terminal (2) 9, memory (3) 27 and display device 12 are controlled by the CPU unit (2) 31 CPU unit (2) is controlled by the input device 11, where the control is performed by movement of the device 11 and actuation of the associated push button.

The pickup unit 1 itself has no image display device. In order to allow the user to confirm the recorded image data, such data is transferred to the computer 2 associated with the display device 12, by which the image data is confirmed.

User Interface of the Image Pickup System

Hereinafter described is how the system operates when the user wishes to confirm the recorded image.

Figure 4:
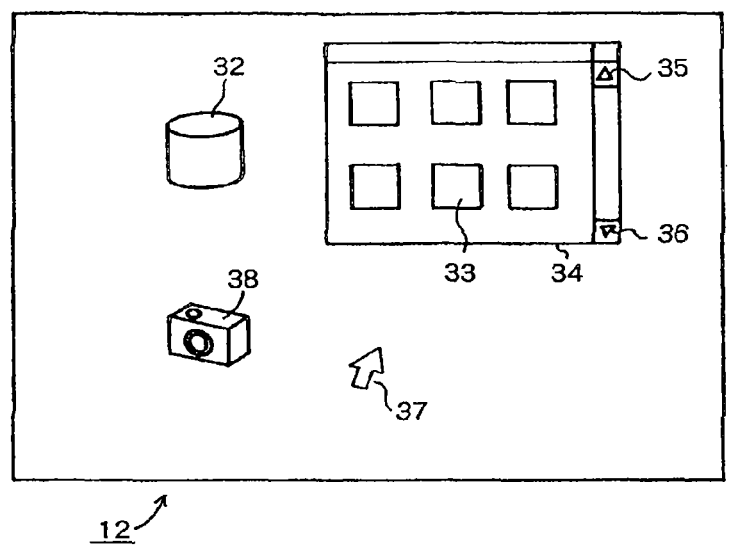
FIG. 4 is an illustrative view of a displayed screen.

FIG. 4 shows a displayed screen of the display device 12, wherein those displayed include an image icon 32 showing the auxiliary memory device equipped in the computer 2, the image data 33 recorded in the auxiliary memory device 28, a displayed window 34 listing the entire image data, and scroll arrows 35 and 36 for upwardly and downwardly scrolling the data list within the display window 34. Further displayed is a pointer 37 which is movable in accordance with displacement of the input device 11. In response to placing the pointer 37 on either of arrows 35 or 36, and depression of the pushbutton of device 11, the image data displayed within the window 34 is scrolled up and down, where up to six frames of image data are displayed at a time.

The pointer 37 is moved onto the image icon 38 displayed on the screen, and the button is clicked, the times of which click is one or two. The method of button operation is in advance provided by the user.

Figure 5:
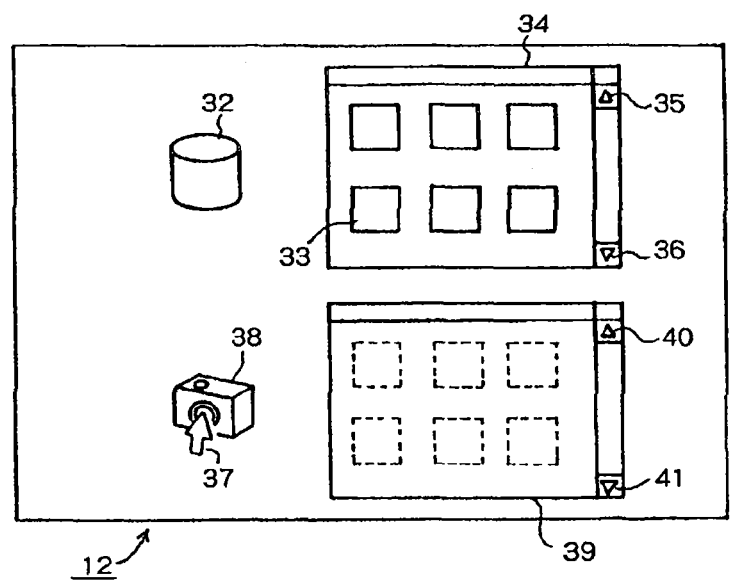
FIG. 5 is an illustrative view of another displayed screen.

The above operation causes a new display window as shown in FIG. 5, wherein also up to six frames of image data can be displayed at a time as in the case of the window 34, and the displayed image data can be scrolled by click on the arrows 40 and 41.

Figure 6:
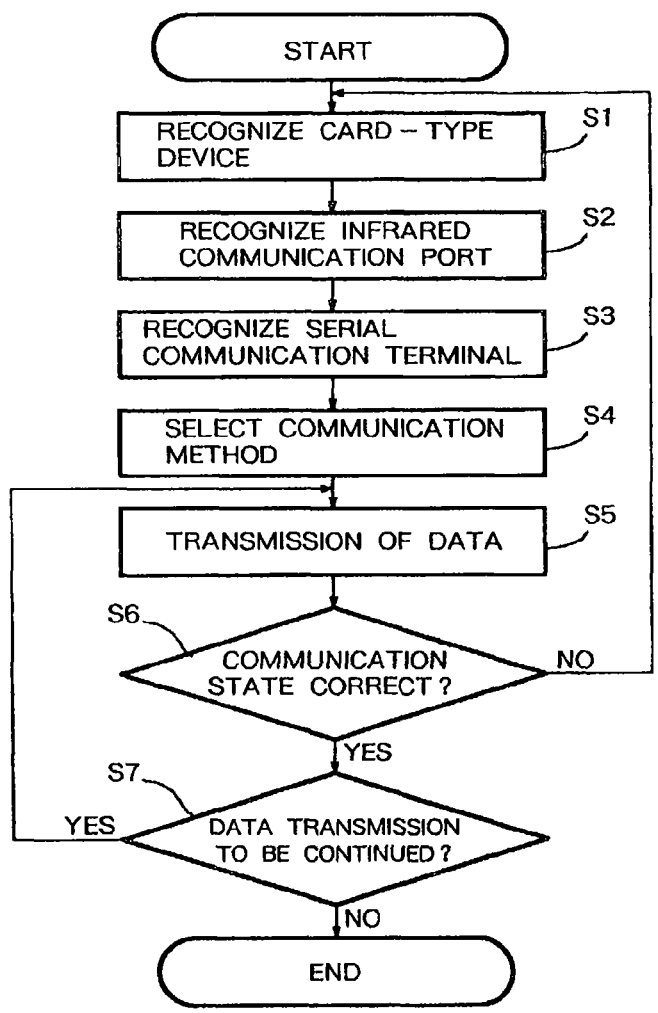
FIG. 6 is a flow chart of an embodiment.

FIG. 6 shows the sequence of the operation performed by the computer 2.

Card recognition is performed in Step S1. A CPU unit 2 in a box 31 in FIG. 3 controls the card slot 8, and it is examined as to whether or not a card-type device has been inserted into card slot 8. When a card-type device is identified, further determined as to whether the device is a image pickup unit 1. The CPU unit (2) manages the communication between card slot 8 and the CPU unit (1) shown as 14 via the card socket 4 shown in FIG. 2. CPU unit (1) sends a recognition signal for indicating the image pickup unit 1 to CPU unit (2). If the recognition signal is not sent to CPU unit (2), the CPU unit (2) determines the card-type unit is not the pickup device. When the image pickup unit 1 is correctly identified, the maximum speed for enabling communication performed between the pickup unit 1 and computer 2 is determined and stored.

In Step S2, the CPU unit (2) examines the state of the communication port (2). First, it is examined as to whether any device other than the image pickup unit 1 just utilizes the communication port. Then, the CPU unit (2) causes the infrared communication port (2) to transmit the initiation data for data connection.

Upon receiving the initiation data by the infrared communication port (1), CPU unit (1) causes the communication port (1) to deliver a recognition signal indicating the receipt of the initiation data. In addition, the CPU units (1) and (2) utilizes the infrared communication ports (1) and (2) to determine the maximum communication speed, which is stored by CPU unit (2).

In Step S3, the CPU unit (2) examines the state of the communication port of the serial terminals 5 and 9. First, whether or not any device other than the image pickup unit 1 already utilizes the communication ports. Then, the CPU unit (2) causes the serial communication terminal (2) to transmit the initiation data for data connection.

Upon receiving the initiation data by the serial communication terminal (1), CPU unit (1) causes the communication terminal (1) to deliver a recognition signal indicating the receipt of the initiation data. In addition, the CPU units (1) and (2) utilizes the serial communication terminals (1) and (2) to determine the maximum communication speed, which is stored by CPU unit (2). If the communication terminals (1) and (2) are not connected together with a cable, it is determined connection of the serial terminals is impossible.

In Step S4, the communication speeds of all communication methods stored through Steps S1 to S3 are compared, and a communication method having the maximum communication speed is selected.

In Step S5, utilizing the communication method selected in Step S4, CPU unit (2) transmits the image data stored in the memory (2) of image pickup unit 1 to the memory (3) in computer 1. The process thereof is described hereinafter.

In Step S6, the state of communication is checked as follows. In the case that the communication method used at present is unusable for some reason, the data transmission is suspended and returned to Step S1 to perform recognition of the communication method in order to select another communication method.

In Step S7, whether it is necessary the data to be further transferred is determined. If the answer is "no", the data transfer is finished. If necessary, the flow is returned to Step S5.

Data Transfer

Figure 7:
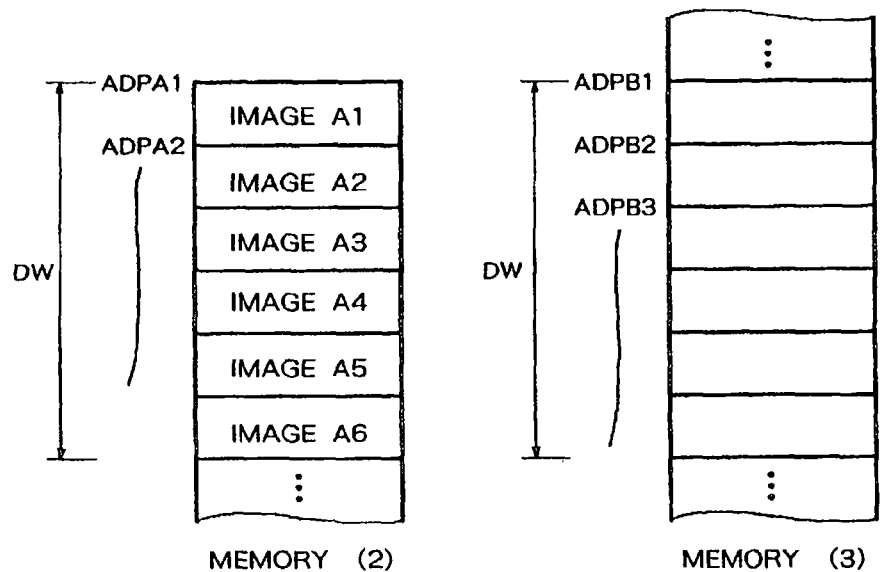
FIG. 7 is an illustrative view of memory maps.

FIG. 7 shows the memory maps for a memory (2) in the unit 1 and a memory in the computer (2).

As shown in FIG. 7, in memory (2), the data are sequentially stored from the old to the new, in the manner that the image data A1 followed by the image data A2 and so on, starring from the head address ADPA1. The memory (3) is enabled to store the image data in the amount more than the memory (2), and, by means of an address pointer ADPB, the image data existing in the memory space including DW (equal to six frames of images) are displayed on the screen of the display window 39 in FIG. 5.

When the image icon 38 shown in FIG. 5 is first clicked, the image data including the amount of DW starting from ADPA1 are copied into the memory area including the space of DW starting from ADPB1, where the data may be copied either entirely or selectively. In parallel thereto, in the display window 39 of FIG. 5, the image data recorded in the memory space including the amount of DW from ADPA1 and thereafter shown in FIG. 7 are displayed.

When the pointer 37 is placed on a window scroll arrow 40 in FIG. 5 and clicked, the CPU unit (2) causes the increase of the address pointer ADPB by the amount of DW/2, and the CPU unit (1) causes the address pointer ADPA to increase by the amount of DW/2. And the data stored from the address numbered ADPA+DW/2 and including the amount of DW/2 (i.e. three frames of images) is copied into the memory space having the capacity of DW/2 starting from the address of numbered ADPB+DW/2 and thereafter in the memory (3). Any of ADPA would not be relocated to the address which is positioned above the address ADPA1 where the newest image data is stored.

On the other hand, when the pointer 37 is placed on another scroll arrow 41 in FIG. 5 and clicked, the CPU unit (2) causes the decrease of the address pointer ADPB by the amount of DW/2, and the CPU unit (1) causes the address pointer ADPA to decrease by the amount of DW/2. And the data stored from the address numbered ADPA+DW/2 and including the amount of DW/2 (i.e. three frames of images) is copied into the memory space having the capacity of DW/2 starting from the address of numbered ADPB+DW/2 and thereafter in the memory (3). Any of ADPA would not be relocated to the address positioned below the memory address ADPA1 where the oldest image data is stored.

Through the operation above, the image data displayed in the window can be scrolled in the upward or downward direction by the amount of three frames of images. The user is allowed to select and review merely the necessary image data without copying the entire data stored in the unit (1) to the memory (3).

Data Storage Operation

The image data stored in the unit (1) are transferred to the computer (2) through the process in the following steps.

Figure 8:
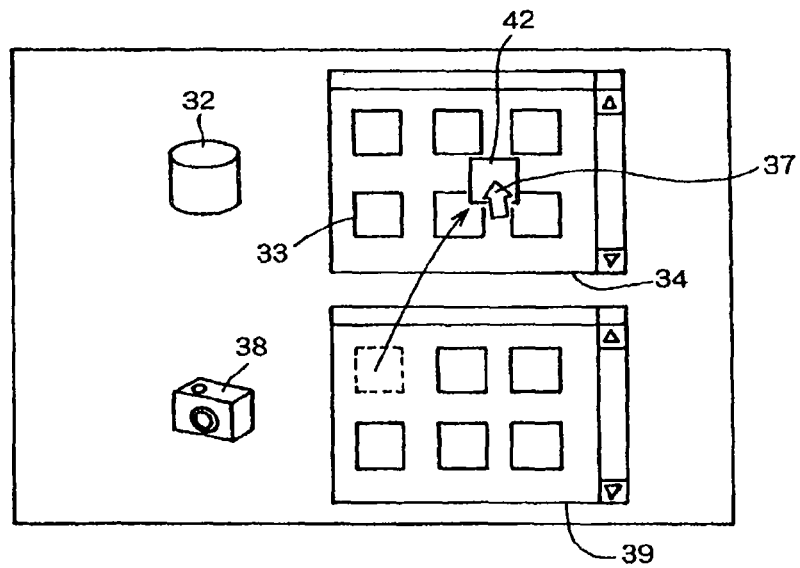
FIG. 8 is an illustrative view of still another displayed screen.

The user selects the image data which are desired to store in the auxiliary device on the window 39 of FIG. 8, where the selected data are the image data 42 shown in FIG. 8. Then, the pointer 37 is placed on the image 42, with the button of input device remaining pressed, and is moved onto the display window 34, and the button is released. This operation is hereinafter referred to "drag and drop", wherein the CPU unit (2) controls the displayed screen as if the image data 42 has actually moved into the display window 34.

As a result, the image data 42 is displayed in the window 34. The CPU unit (2) causes an image data corresponding to the image data 42 to be copied from the memory (3) in FIG. 3 to the auxiliary recording device 28. At this time, when the image data in memory (3) is those thinned-out copied from the memory (2), merely such selected image data are copied into the auxiliary recording device 28, and the further selection of the data would not be performed. The data having the same content as those copied in the device 28 and stored in memory (2) or (3) may be erased as necessary.

As discussed above, the invention provides an image pickup system by which the necessary communication between the image pickup unit and computer is automatically implemented, without causing the user to be conscious on the data transfer, and also provides a system which is easily operated.

Another embodiment of the invention is described with reference to FIGS. 9, 10 and 11. FIG. 10 shows the entire system of an embodiment including an image pickup device and a computer. The entire system comprises a pickup unit 1a including an optical system and signal processing means, a computer 2a, a CPU system 43 for the computer 2a, an interface (I/F) 44 for interconnecting the pickup unit 1a and computer 2a, a display system 45 for computer 2a, a memory system 46 for computer 2a, an operating program storage 47 having the content being rewritable for controlling the computer 2a, a power managing system 48 for computer 2a, a battery 49 for the computer 2a, and an external power device 50 as the power supply for computer 2a.

The portion enclosed by the dotted line in FIG. 10 shows the pick up unit 1a in detail.

The system also comprises a lens unit 51 including a zoom and focus lenses and a stop, and a lens controller 52 for driving lenses. The system may further include an automatic focusing device, an automatic exposure unit of well known; and also an automatic vibration preventing device (for preventing hand vibration). Also, included are a CCD 53 as a pickup unit, an A/D converter 54, a timing generator (TG) 55, a digital signal processing device (DSP) 56, a FIFO memory 57, and a control unit 58 and also a memory control connected to pickup unit 1a. Further included are an interface 59 for external connection (camera I/F), a DC/DC converter 60; a card interface 61 (a card I/F) for connection, a zoom switch 62, the output of which is connected to the control unit 58 to enable the lens control in response to the zoom switch 62. In addition, an external memory card 70 is formed of a flash memory.

The image pickup unit 1a is detachable with the computer 2a. Specifically, the interface 44 is provided with a card slot, while a part of the pickup unit 1a has the same configuration as the PC card, hence, in the connected state, the region of the lens unit 51 is allowed to extend over the computer 2a to enable the image pickup operation. The pickup unit 1a can be separate from the computer 2a by depression of an eject button not shown.

Figure 9:
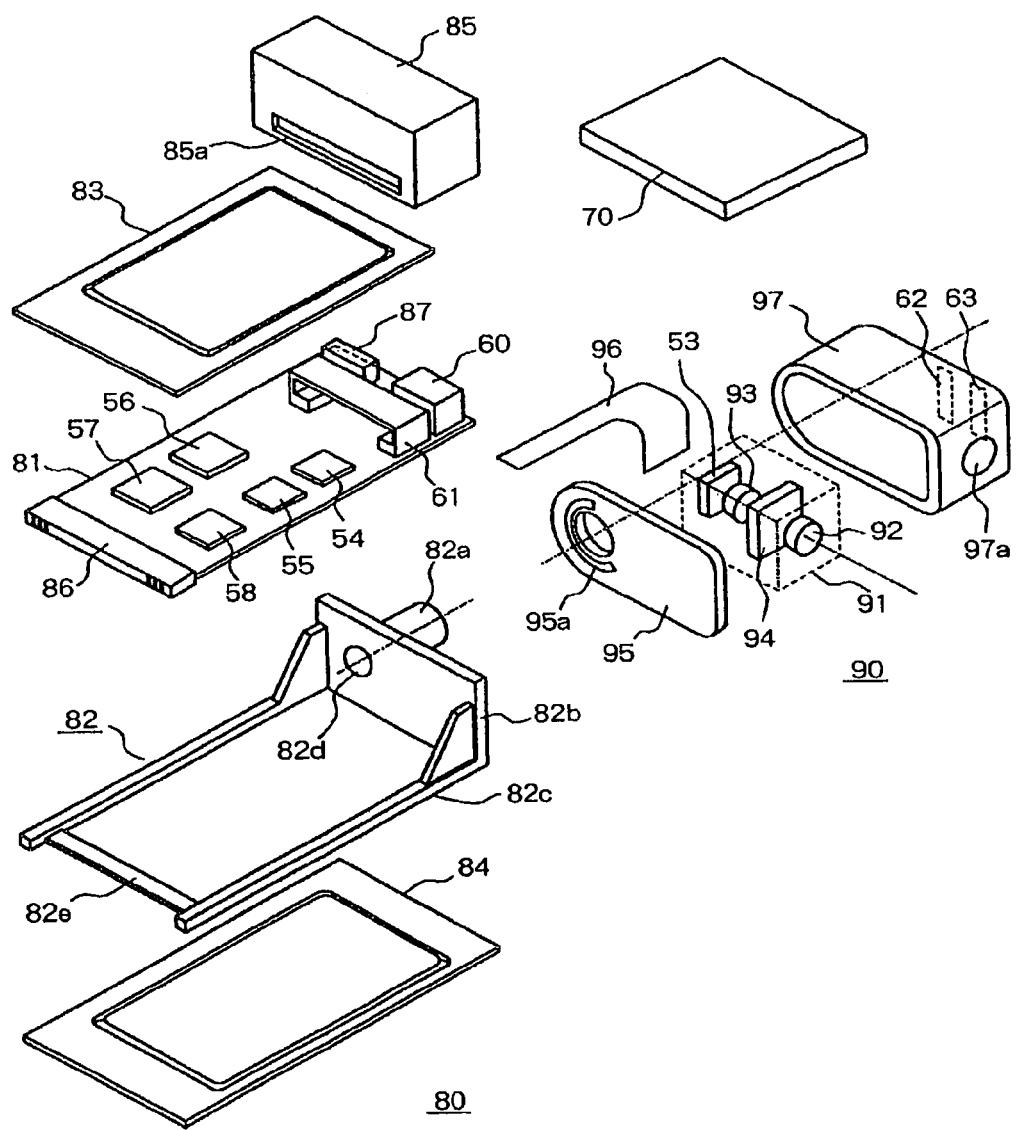
FIG. 9 is a perspective view of an embodiment of an image pickup unit according to the invention.
Figure 10:
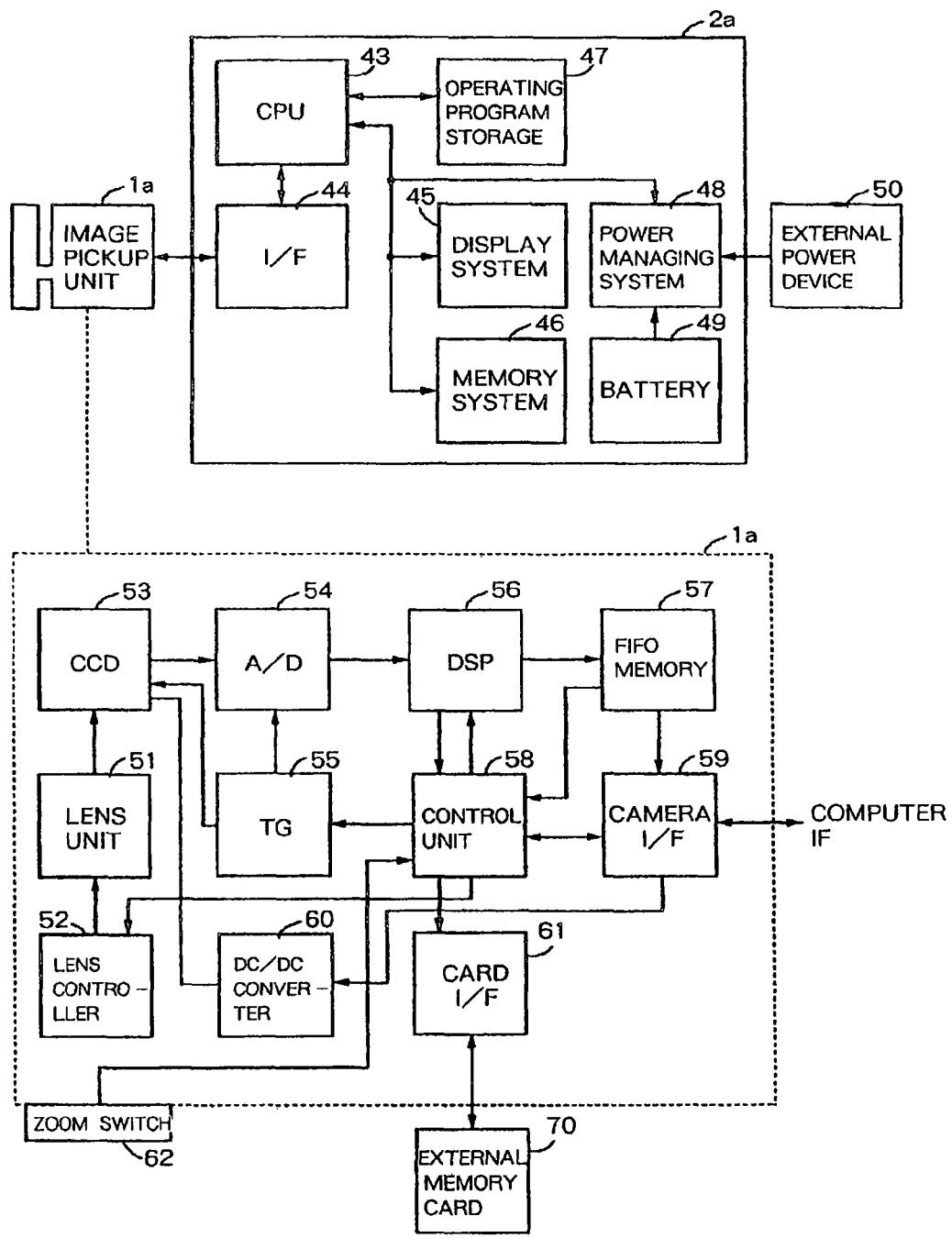
FIG. 10 is a block diagram of a system including an image pickup unit and a computer according to an embodiment.

Next, FIG. 9 shows the specific construction of the image pickup unit 1a. The same part is denoted by the same numeral in the block diagram. The unit 1a includes a card body (output part) 80 and an image pickup head (image pickup part) 90.

The card body 80 comprises a main substrate 81, on which a card connecter 86 is mounted, and those previously mentioned are mounted, including the A/D converter 54, timing generator (TG) 55, digital signal processing device (DSP) 56, FIFO memory 57, control unit 58, DC/DC converter 60, card interface 61 (card I/F) and a flexible connector 87. In order to prevent noise generation, the DC/DC converter 60 is provided with a shield case from the both sides of the substrate 81.

A card frame 82, to which the card connecter 86 is connected, supports the main substrate 81, and is formed substantially in a frame structure. The frame 82 is further provided integrally with a frame wall 82a, on the side thereof opposite to the side on which the card interface 61 and card connecter 86 are mounted, and further a rotational support 82b is vertically mounted on the frame wall 82a. On each side of frame wall 82b, respectively a side beam 82c is attached, and, on the ends of the side beam 82c, a single transverse rib 82e are provided. Also in the rotating support 82a, a communication region 82d for receiving a hereinafter mentioned flexible substrate 96.

A pair of metal covers 83 and 84, interposing therebetween the main substrate and card frame, is secured to card frame by way of adhesive or mechanical connection, and also serves as a shield against noise or the like. By the covers 83 and 84 and part of the card frame 82, the external configuration of the card portion is formed and is enabled to be received by the card slot of computer 2a.

The card case 85 is affixed to card frame 82 by means of screws or the like; on the position corresponding to the card case 85 of main substrate 81, comparatively higher components, such as including the DC/DC converter 60, card interface 61 (card I/F) and flexible connector 87, are mounted. On the side surface of the card case 85, an opening 85a for receiving the memory card 70 is formed. The memory card 70 is inserted from the opening and connected to the card interface 61. At the opening 85a, also a shutter not shown is provided, which is closed, unless a memory card 70 is installed, but is open as soon as the card is inserted. This prevents an incident of introducing any dust.

Hereinafter, the image pickup head 90 is described.

An optical image pickup unit 91 includes a zoom lens 92 and a focus lens 93, which are disposed so as to be moved in the direction of the optical axis. Between the zoom lens 92 and the focus lens 93, a stop unit 94 is provided. An optical beam transmitted through the zoom lens 93, focus lens 93 and stop unit 94 is focused at the CCD 53. The pickup unit 91 further includes a zoom lens drive motor, a focus lens drive motor, and IG meter, and a lens controller 52. The lens unit 51 comprising the zoom lens 92, focus lens 93, and stop unit 94 is operated by means of the lens controller 52.

A rotatable plate 95, to which the image pickup unit 91 is mounted, is resiliently biased by a not illustrated clamp member connected to the support 82a for rotation of the above-mentioned card frame 82, and is, therefore, rotatably supported on the support 82a for rotation. The card frame 82 is provided with an annular groove 95, which is engaged with a not illustrated projection formed on the surface of card frame 82 facing the rotatable plate 95, so that the projection slides along the groove 95 according to the rotation, thereby the pickup head 90 can rotate by 180 degrees so that the optical axis thereof swings for 180 degrees over the range from the horizontal direction, via the vertically upward direction, until the axis is oriented to the opposite horizontal direction.

The flexible substrate 96 serves to transfer the output of the CCD 53 as well as the drive instructions to be supplied to lenses and stop to the main substrate 81, and is passed through the communication region 82d of the rotating support 82a, and further the end of the substrate 96 is connected to the flexible connector 87.

The pickup case, which forms the external housing, is provided with an opening coincident with the optical axis, and with the zoom switch and focus switch 63 on its surface perpendicular to the rotating axis. The state of the switch is further transferred to the main body.

When desired to change the photographic angle, such a change is achieved by operating the zoom switch 62.

The rotational axis of the pickup head 90, in order that the head 90 would not extend below the lower end of the card body when rotated, is dimensioned so that the end surface opposite to the wall having formed of the opening 97a is curved to have a radius not exceeding the value R, where R is the distance ranging from the lower surface of the main bode to the rotational axis.

Figure 11:
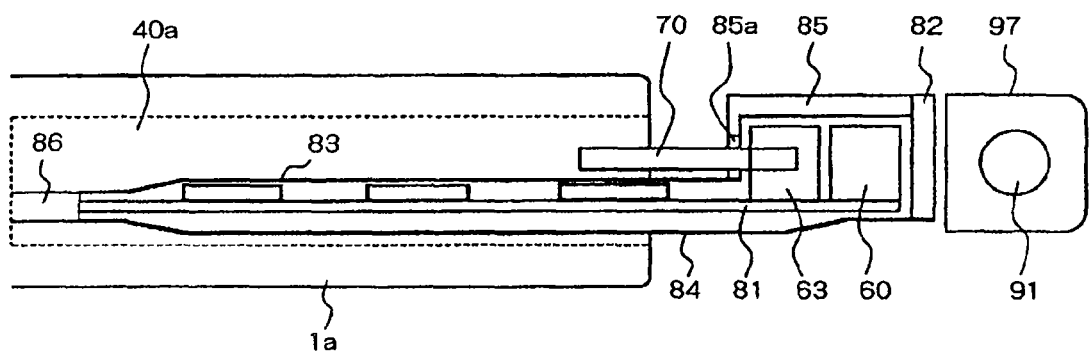
FIG. 11 is a sectional view of an image pickup unit connected to a computer.

FIG. 11 shows a general view in section of the image pickup unit 1a, when connected to the computer 2a, wherein the slot 40a enclosed by the dotted line is that for receiving a PC card, into which two PC cards of TYPE II or a single one of TYPE III can be received. The pickup unit 1a includes the DC/DC converter 60, card connecter 61, and memory card 70, main substrate 81; and further included are the side wall 82 of the card frame, covers 83 and 84, card case 85, PC card connecter 86, optical pickup unit 91, and image pickup case 97. The external profile of the card formed of covers 83 and 84 corresponds to the card of TYPE II. The memory card 70 is inserted into the card connecter 61 along the longitudinal direction of main substrate 81 and in parallel therewith, and is partially enclosed within the slot 40a.

When the pickup unit 1a equipped with the memory card 70, within which a program (camera utility program) for driving the image pickup system is stored, is inserted to the card slot of computer 2a, and such a program is started by the computer 2a, then the power is supplied to pickup unit 1a. The object to be photographed is focused on the CCD 53 through the lens unit 51. Responsive to the timing pulses generated from TG 55, the image data is obtained by CCD 53 and A/D converter 54, and is converted to the digital data. The time interval of the timing pulses is controlled by control unit 58. The digital data is processed by digital treatment, tentatively stored in FIFO memory 57, and, thereafter, the data is transmitted in the order of having stored, through the camera interface 59. On the side of the computer 2a, the transmitted images are displayed by means of the display device 35.

In addition, focus control and exposure control are performed based on the recorded signal.

In recording the image, upon actuation of a mouse or space key, a stationary image information just at the time of such actuation or a movable image information after the time of the actuation is recorded in the memory card. Whether to be recorded in the memory card 70 or in the memory system 46 of the computer 2a itself, can be selected based on the camera utility program.

Also, since the memory card 70 is recognized as a drive by the computer 2a, it is possible to, store any information other than that relating to the card-type image pickup system.

As described above, according to the embodiment, since a memory card can be directly connected to the card-type image pickup system, a camera utility program is stored in a memory card to enable the operation of the card-type pickup system by an arbitrarily selected personal computer, thereby the image recording being performed without taking consideration of the memory capacity of the main system.

Also, the memory card 70 may be received in parallel with the card portion, and the entire system can be formed with a reduced dimension in height.

Instead of installing the optical system having a zoom or auto-focus functions as described above, also it is possible to employ those including a single focus, manual focus or manual stop, thereby saving the power consumption, where neither the lens controller nor the signal line therefor is needed, and the flexible substrate 66 can be minimized to enable the cost reduction.

Hereinafter described is a third embodiment of the invention referring to FIGS. 12 to 13, in which the computer 2a having one slot TYPE II is also compatible. The same components are depicted by the same numerals as in the second embodiment.

Figure 12:
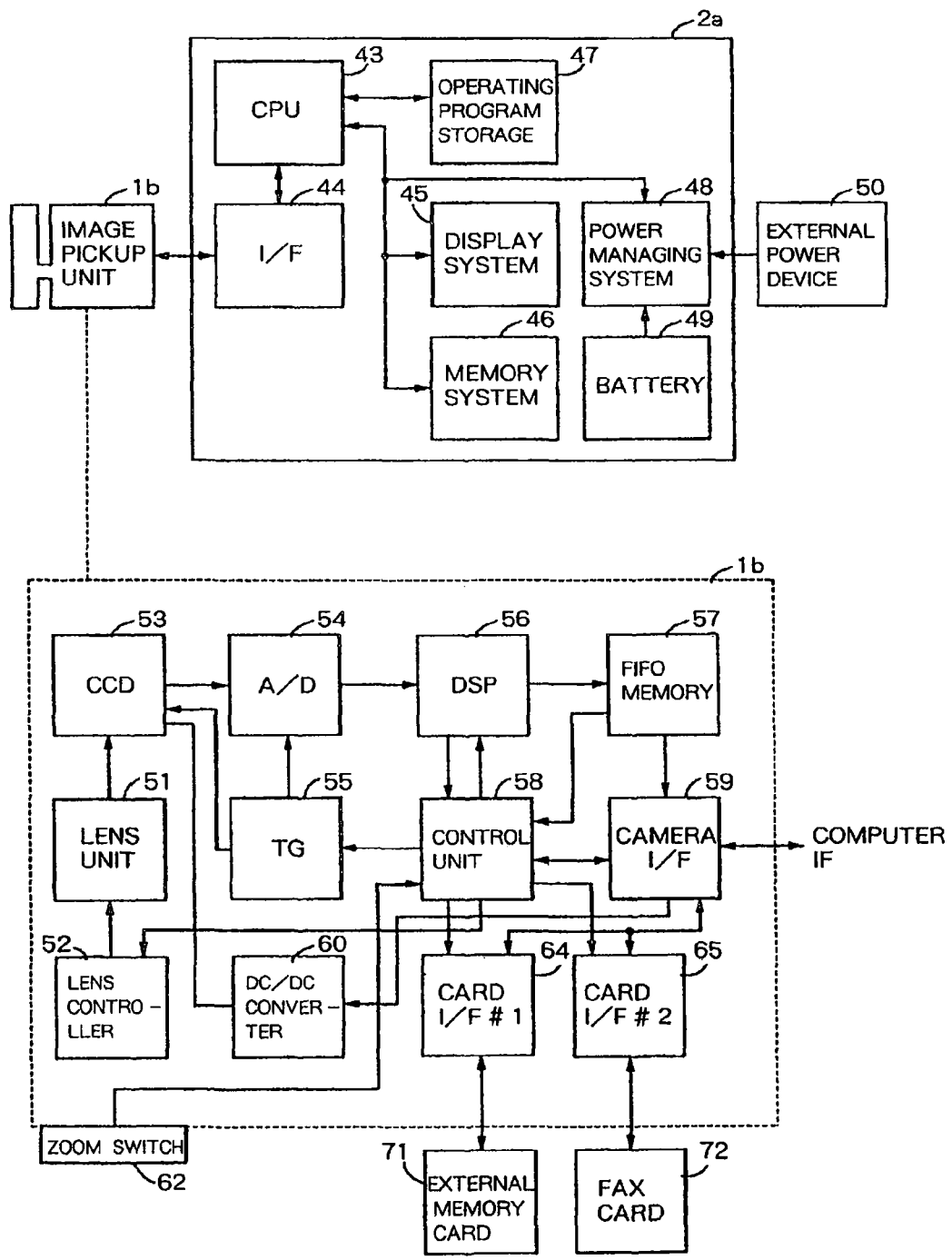
FIG. 12 is a block diagram of a system including an image pickup unit and a computer according to an embodiment.

FIG. 12 shows the entire system including an image pickup system and a computer, wherein a block diagram enclosed by the dotted line shows the image pickup unit 1b including components 41 to 65.

A control unit 66 is provided with the functions of control of the memory connected to the pickup unit, and also of selection between card interfaces (I/F) #1 64 and #2 65, and further includes a buffer for tentatively storing the information from the card.

An external memory card 71 is formed of such as a flash memory, and numeral 72 is a FAX card.

Figure 13:
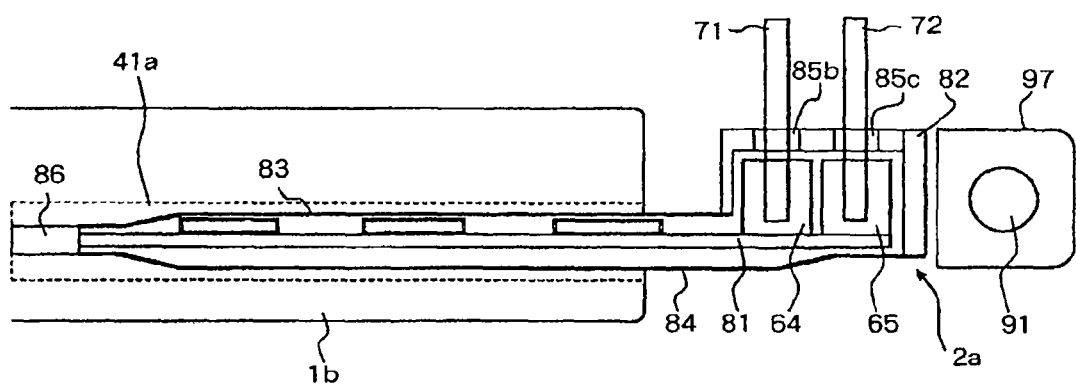
FIG. 13 is a sectional view of an image pickup unit in FIG. 12 connected to a computer.

FIG. 13 is a sectional view of the pickup unit 1b which is inserted to the computer 2a, where the computer 2a includes the slot 41a enclosed by the dotted line for receiving a PC card, into which one piece of TYPE II card can be inserted. The pickup unit 1a comprises a card I/F (connecter) 64 for receiving a memory card 71 in the direction perpendicular to the main substrate 81, a card I/F (connecter) 65 for receiving a FAX card 72 also perpendicularly relative to the main substrate 81, and a card case 85, formed with an opening 85b on the upper surface corresponding to a memory card 81 and FAX card 82. The profile formed of covers 83 and 84 is configured to correspond to the TYPE II card.

With the above-described construction, even in the case that merely a single card slot for TYPE II card is provided in the computer, a card-type pickup system is enabled to operate with any of the personal computer by storing a camera utility program within a memory card, and accordingly the image is recorded without being concerned if the memory capacity of the main system would be sufficient. Also, since the control unit 66 can function as the bus selector, the recorded image may be tentatively stored in memory 46 of the personal computer 2a itself, and the stored information can be further transmitted via the FAX card for communication. Of course, not limited in the image information, any information stored in the computer can be also transmitted. Also, as the cards such as memory card 71 are vertically connected, the pickup unit can be formed without increasing the longitudinal dimension thereof.

Whenever the slot can receive two PC cards of TYPE II or one, PC card of TYPE III, the memory card would not interfere the slot. Hence the advantage is that, in the state with a card being connected, any other IC card may be also inserted.

Other than the memory card or FAX card, any other card such as a LAN, or IrDA card may be also connected. In other words, the third embodiment provides the same effect as that a slot has been additionally provided.

Instead of vertically connecting the card, the card may be connected in parallel with the card receiving area of the computer, but extending sidewise from the end of the computer.

Also, instead of the FAX card or the like being connected to the pickup unit as above, another structure is possible where the pickup unit is connected to the FAX card.

The fourth embodiment is hereinafter described referring to FIGS. 14 and 15, in which the slot provided in the computer 2a is configured to receive the PC card of TYPE III, and not for both the PC cards of TYPE II and TYPE III. Also, each of the same components are represented by the same numeral as in the previous embodiment.

Figure 14:
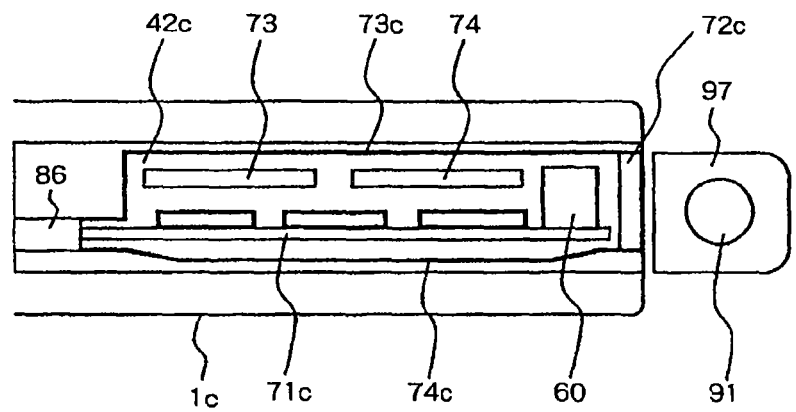
FIG. 14 is a sectional view of an image pickup unit connected to a computer according to another embodiment.

FIG. 14 is a summary view of the pickup unit 1c which is coupled to the computer 2a, which computer 2a comprises a slot 42c enclosed by the dotted line receiving the PC card, in which two cards of TYPE II or a single PC card of TYPE III is inserted. The image pickup unit 1c includes a DC/DC converter 73, a memory card 74, main substrate 71c; and further included are the side wall 72c of the card frame, and covers 73c and 74c. The profile formed of covers 73c and 74c is configured to coincide with the card of TYPE III, and memory cards 71 and 72 are inserted to a card connecter 75 sidewise and in parallel with the main substrate 81.

Figure 15:
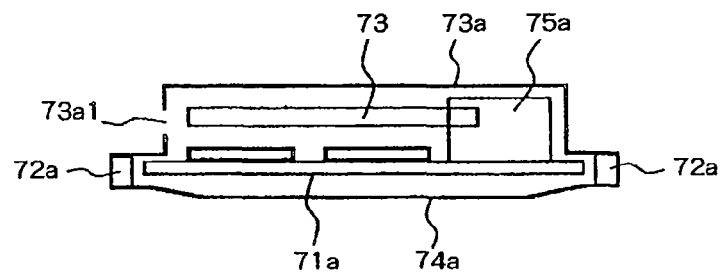
FIG. 15 is a side sectional view of the system shown in FIG. 14.
Figure 16:
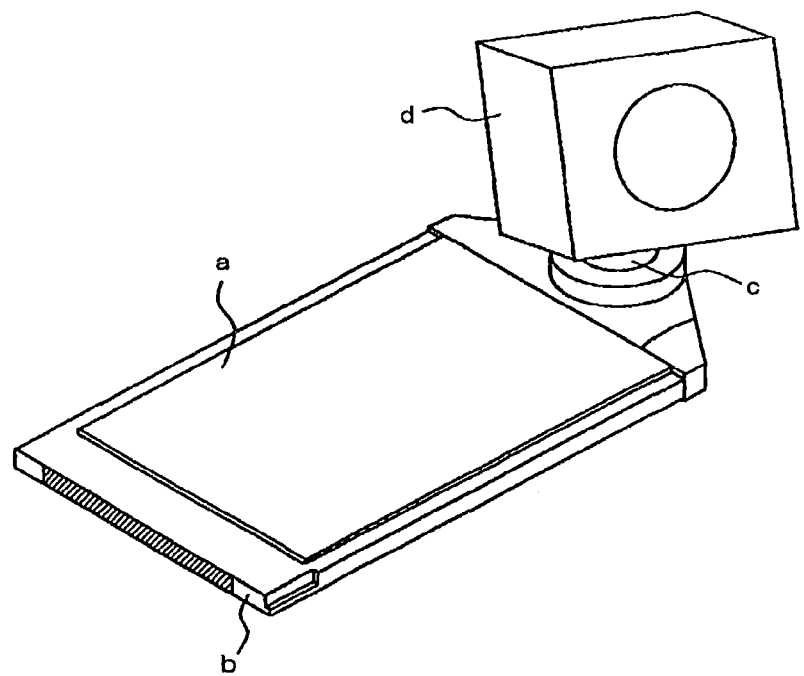
FIG. 16 is a perspective view of a prior art card-type image pick up system.

FIG. 15 is a section viewed from the side direction of FIG. 14, adjacent the memory card 73. An opening 73a1 for receiving the memory card 73 is formed on the side wall of the cover 73c, and, adjacent thereto, another opening for the memory card 74 is formed. The opening 73a1 is formed with a shutter but not shown, which is closed unless the memory card is inserted therein, and is open upon insertion thereof to prevent introduction of dust.

According to the construction, a number of memory cards can be installed to increase the number of images to be stored. It is possible to utilize one card for loading the camera utility program, and another for storing the image data. The cover 73a may be also utilized as a shield member for the DC/DC converter 60. As a result, the converter 60 is reduced in its height, and may be enclosed within the card receiving area, so that the extending portion is merely the pickup unit, thereby the dimension in the longitudinal direction of the card is reduced.

The fifth embodiment will be described, in which a flush memory for storing is in advance mounted. Although an image file having a large capacity as provided in the second to fourth embodiments may not be possible, still an image file including several to tens frames of images is realized. For example, for the flash memory corresponding to 8 M bit, when the image comprising the pixels of product of 320 into 240 and compression according to the jpeg type is performed under the condition of a compression ratio of ⅛ and 8 bit for each color of RGB, the storing of images in the order of 30 frames is enabled. Similarly, in the case of moving images, the needed time is 4 seconds, when the frame rate is 7.5 frames per second. The time can be varied depending on the capacity of the mounted flash memory, the size of the image to be recorded, or compression ratio, and the rate of compression ratio in the case of moving images. The card connecter is not needed to enable the small-sized construction.

The other embodiment is possible, in which, instead of connecting the camera head to the card body for allowing mechanical rotation as in the above embodiment, also it is possible to connect the devices with a cable, to provide an image pickup over an angle wider than that when the camera head is rotated for 180 degrees of angle.

As discussed above, the invention defined by claims 3 and 4 provides an improved electronic system capable of storing sufficient image information, even provided with a memory having not a large capacity; because such a system, which is powered by an external power source and produces image information to an external device, comprises: image pickup means; an output device provided with a connecter for producing the image information from the pickup means; the output device includes as a part thereof a card-shaped portion; and the output device is provided with an interface for connecting a memory device capable of storing the image information applied from the image pickup means.

Also, the invention defined by claim 15 provides an electronic system, to which a plurality of external devices can be connected, even in the case that many devices cannot be connected in the external device itself: because such a system, which is powered by an external power source and produces image information to an external device, comprises an interface for connecting another electronic device having a card-shaped connecting port.

Further, the invention defined by claims 19 and 20 provides an improved system having a large memory capacity, by providing rather a memory capable of recognition as the storage for the external device, instead of separately causing the external device to recognize the control information: because the system is provided with a memory device or an interface for connecting such a memory device storing a program for controlling the electronic device.

Figure 17:
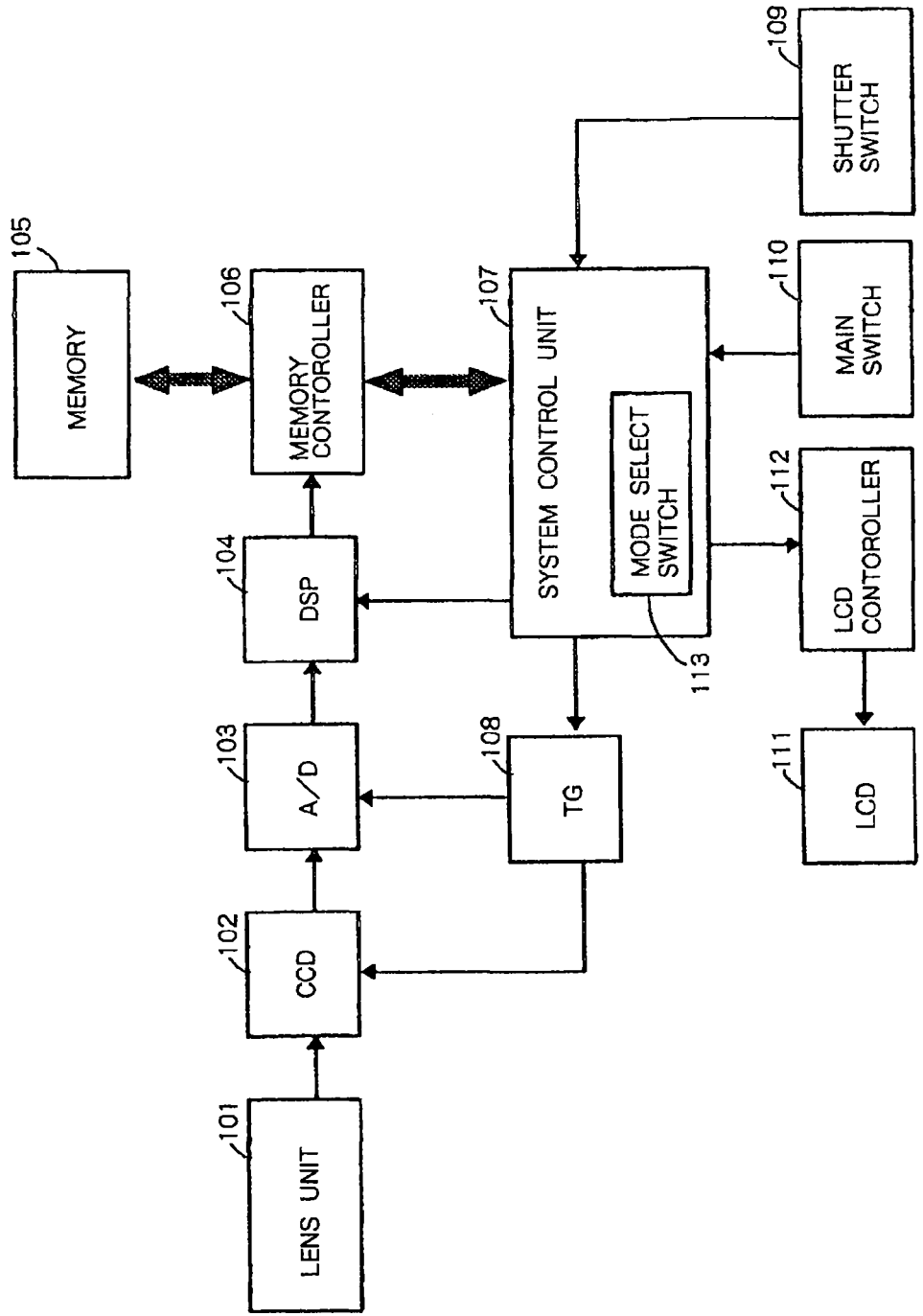
FIG. 17 is a block diagram of an embodiment of the invention.

FIG. 17 is a block diagram of another embodiment of the invention, which includes a lens unit 101, an image pickup element 102 (CCD), an A/D converter 103, a pickup signal processing unit (DSP) 104 for image processing of the digitally converted image signal by the A/D converter 103, a recording medium (memory) 105 for storing the processed signal and the signal compressed from the processed signal, and a memory controller 106 for controlling the memory 105.

The embodiment further includes a system control unit 107 for controlling the operation of the camera, a timing signal generating circuit 108 (TG) for generating a timing signal for causing the image pickup element 102 (CCD) and A/D converter 103 to operate, a shutter switch 109, and a main switch 110 for the user to select the pickup system between operative and non-operative, a LCD 111 for representing the amount of the digital images including uncompressed images and compressed images, and a LCD controller 112 for controlling the LCD 111. The system control unit 107 includes a mode select switch 113 for selecting between the image pickup mode and image compression mode.

Referring to FIG. 17, the flow of the operation of the image pick up system is described, including the steps until the completion of the digital image signal recorded in the memory.

In response to pressing of the shutter switch by the user, the pickup system starts operation for image pickup. At this time, it is necessary that the mode select switch 113 has been turned to the image pickup mode. First, the timing signal generating circuit 108 generates a drive pulse, which actuates the CCD and A/D converter 103. The image signal is photoelectrically converted in the CCD 102, and further converted to a digital signal in the A/D converter 103.

The digitally converted image signal is converted to a brightness signal and a color difference signal, and further subjected to processing of thinning-out and interporation. More specifically, the signal is converted to the digital signal in the processing unit (DSP) 104, so as to have a particular size having each of horizontal and vertical pixels, such as including 640 pixels in the horizontal direction and 480 pixels in the vertical direction (or 320 in horizontal and 240 pixels in vertical, respectively), wherein each picture element having the brightness information of 8 bit, and the color difference information of 8 bit. The signal thus processed is stored in the memory 105 under the control by the memory controller 105.

Figure 18:
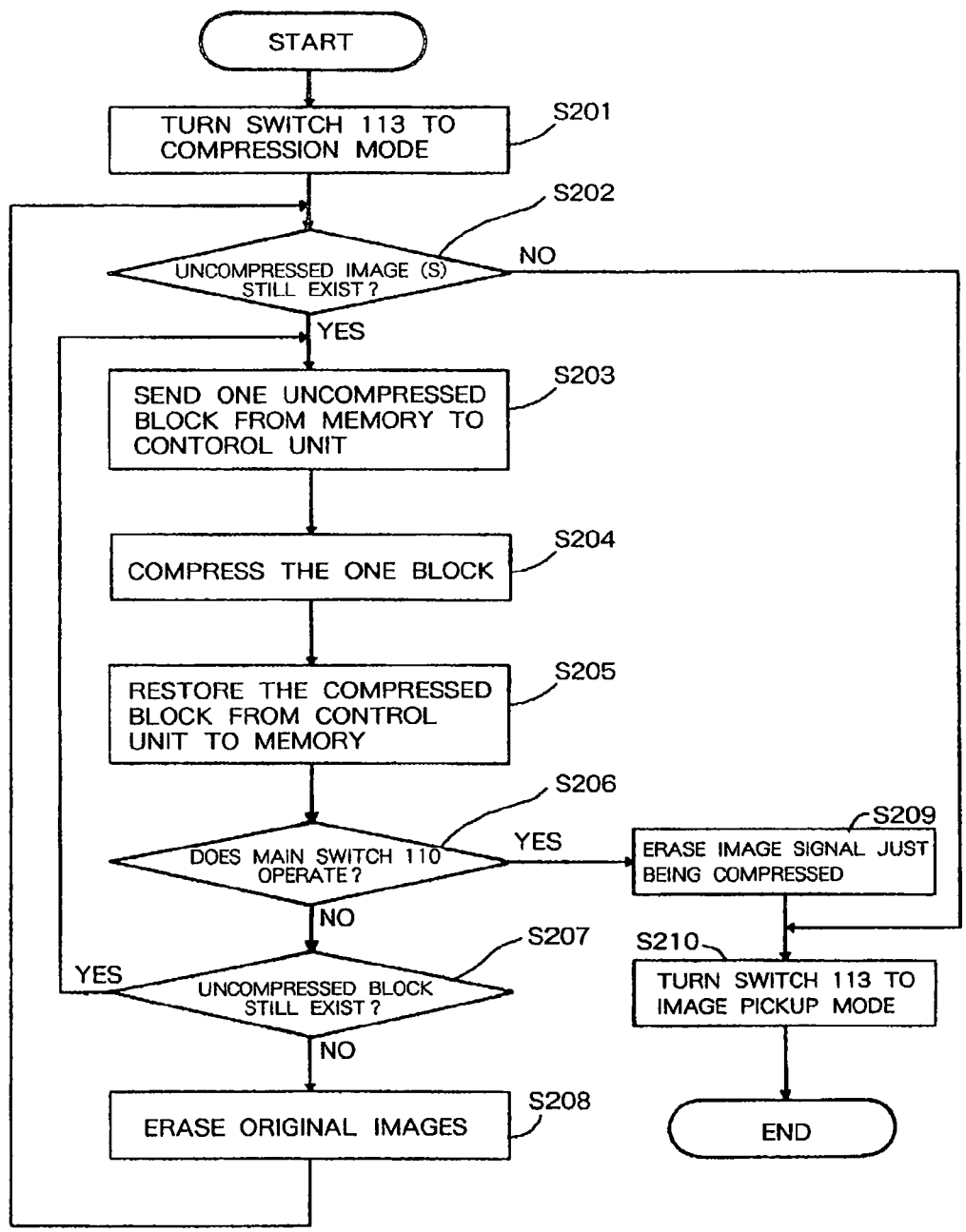
FIG. 18 is a flow chart of the sequence of compression operation for a picture image.

The flow of the compression of the digital image signal is described referring to the flowcharts of FIG. 17 and FIG. 18. The signal compression mode is initiated in response to the main switch 110 being turned inoperative by the user.

First, in Step S201, the mode select switch 113 is turned to compression mode; then, in Step S202, if any uncompressed signal still exists in memory 105, the signal existing in 105 is read in the control unit 107 according to a specific unit block basis, such as including the vertical 8 pixels and horizontal 8 pixels. In Step S204, compression is performed for each unit block which has been read-in above according to the predetermined compression program; and the result of calculation of compression is again stored in memory 105. In Step S207, whether any uncompressed block exists is examined, and the compression process is continued until all the image signals have been compressed. As a result of compression, an original digital image signal formed of 640×480 pixels originally has been divided into 80×60 blocks, when one block is of 8×8 pixels.

In Step S208, after compression for all the image signals is completed, the original signals which remain uncompressed in the memory 105 are erased. The flow returns to Step S202, the uncompressed signals are further examined. If determined none remains uncompressed, finally the mode switch 113 is turned to the pickup mode in Step S202.

In case the user incidentally turns the main switch 110 operative even when the compression is still continued, the compression process is tentatively suspended and image pickup mode is immediately enabled, the procedure thereof is described again referring to FIGS. 17 and 18. Namely, in Step S206 in FIG. 18, the main switch 110 is examined as to if it has been turned operative.

When the switch 110 is determined operative, the image signals just being compressed but already compressed are erased from the memory 105 and compressing operation is suspended. Subsequently, the mode switch 113 is turned to image pickup mode, thereby the image pickup system is turned to the status in which image pickup up is enabled.

Figure 19:
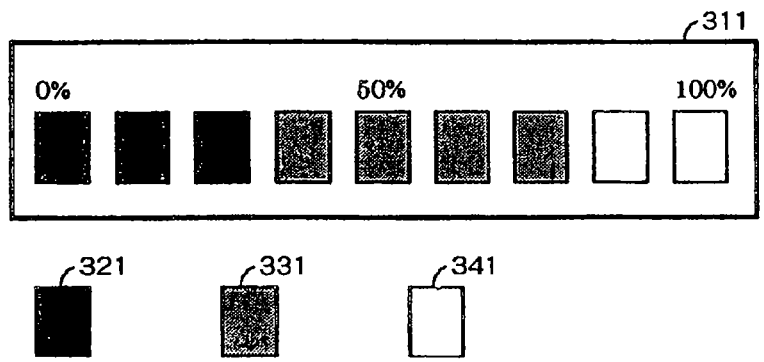
FIG. 19 is an illustrative view of displayed figures representing each amount of recorded images.

FIGS. 17 and 19 show the procedure how the amount of each of uncompressed and compressed digital images, respectively, is informed to the user. FIG. 19 shows an example of representing the amount of digital images displayed in the form 311 on the LCD 111, where the amount of uncompressed and compressed digital images is schematically illustrated, such that the FIGS. 321 and 331 each represents the compressed and the uncompressed, respectively, and the FIG. 341 represents each empty space in memory 105.

For the purpose described above, the means is provided in the pickup system for measuring each amount of digital images of uncompressed and compressed. In addition, such measurement is performed at the time whenever a new digital image is stored and a digital image is erased, and the result thereof is also displayed in LCD 111. Namely, the user is allowed to be informed as to what amount of the uncompressed and compressed digital images are stored in the recording medium.

As described above, immediately after the image compression mode is suspended, the image pickup mode is restated according to the above embodiment. In contrast thereto, another embodiment further provides the feature that the compression mode is not immediately suspended but still continued until the compression process is finished, and thereafter the image pickup mode is recovered, the process of which is described referring to FIGS. 17 and 20.

Figure 20:
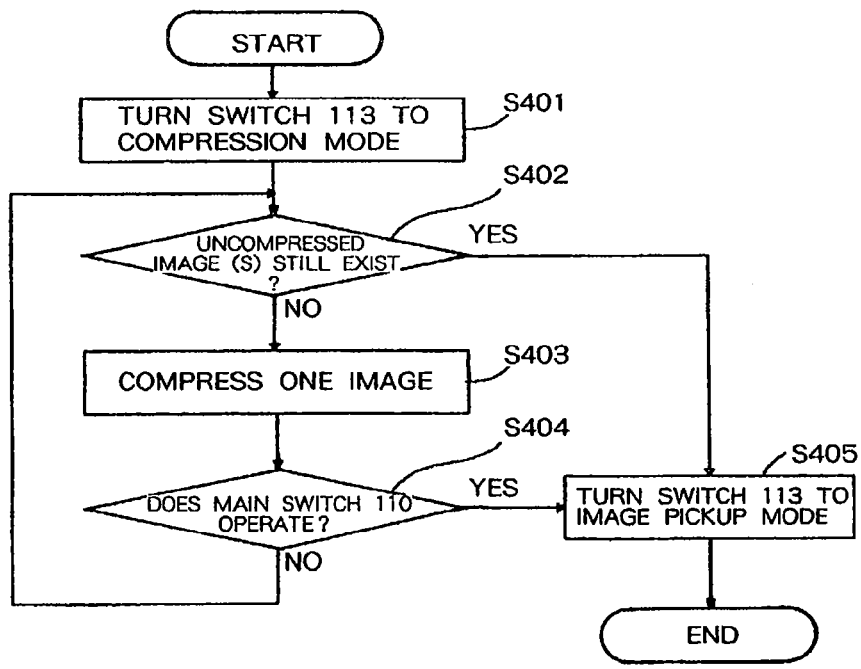
FIG. 20 is a flow chart of the sequence of image compression operation according to another embodiment.

FIG. 20 is a flow chart showing a compression sequence which is initiated by turning the main switch 110 off to cause it disable by the user of image pickup device.

In Step S403, every one image is compressed; every time the compression of one image is completed, the main switch 110 is confirmed as to whether it has turned to the enabled state in Step S404. When being turned enable, in Step S406, the mode switch is turned to the image pickup mode. As a result, even if the user provides a standby indication for image pickup operation during the period of an image compression, such an indication is ineffective until termination of compression, and the mode for image pickup is enabled barely after the compression of the image just being compressed is finished.

As described above, the signal compression is started in response to the main switch 110 being turned off in the two embodiment above. Slightly deviated therefrom, in still another embodiment, after awaiting for a predetermined period during which there has been no turn-on, first the main switch 110 is automatically turned off and thereafter the image compression is restarted.

As discussed above, the invention provides an image pickup system equipped with means for receiving a pickup standby indication from the user. More specifically, the signal is tentatively stored in the memory in the state of being uncompressed; and the compression is performed in the period during which no image pickup operation takes place, such as when the main switch remains off by the user, or when determined there is no turn-on by the user for a predetermined period of time, thereby the time interval until the time when pickup of the next image is again enabled to start being reduced.

Also, the invention provides the process for responding to the standby indication for image pickup such as a turn-on of the switch by the user during the period of image compression.

The invention further provides the means for informing each amount of uncompressed and compressed digital image signals to the user.

What is claimed is:

1. A display control apparatus connectable to an image pickup device having a first memory device within which image data is stored, comprising:
   at least one communicator configured to communicate with the image pickup device, wherein the communicator obtains image data stored in the first memory device if the communicator receives a signal indicating that a device connected to the display control apparatus is the image pickup device, wherein the communicator communicates at a rate according to a device connected to the display control apparatus;
   a display controller configured to display an icon indicating the image pickup device together with an icon indicating a second memory device arranged in the display control apparatus if the signal indicating that a device connected to the display control apparatus is the image pickup device is received by the communicator, wherein an appearance of the icon indicating the image pickup device differs from an appearance of the icon indicating the second memory device; and a designator configured to designate the icon indicating the image pickup device, wherein the display controller displays a list of image data stored in the first memory device in the image pickup device if the image pickup device icon is designated by the designator.

2. The display control apparatus according to claim 1, wherein the display controller displays a scroll arrow for scrolling the list of the image data.

3. The display control apparatus according to claim 1, wherein the display controller displays a list stored in the second memory device.

4. The display control apparatus according to claim 3, wherein the display controller displays the list of the image data stored in the first memory device and the list of the image data stored in the second memory in different display windows.

5. The display control apparatus according to claim 4, wherein:
the designator can select an image data from the list of the image data stored in the first memory device; and
the image data selected by the designator is stored in the second memory device if the image data selected by the designator is dragged and dropped onto the list of the image data stored in the second memory device.

6. A method for controlling a display control apparatus connected to an image pickup device having a first memory device within which image data is stored, comprising steps of:
obtaining image data stored in the first memory device from the display control apparatus if a signal indicating that a device connected to the display control apparatus is the image pickup device is received;
displaying an icon indicating the image pickup device together with an icon indicating a second memory device arranged in the display control apparatus if the signal indicating a device connected to the display control apparatus is the image pickup device is received, wherein an appearance of the icon indicating the image pickup device differs from an appearance of the icon indicating the second memory device; and
designating the image pickup device icon, wherein a list of image data stored in the first memory device arranged in the image pickup device is displayed if the image pickup icon is designated by the designator;
wherein the display control apparatus communicates at a rate according to a device connected to the display control apparatus.

7. The control method according to claim 6, further comprising a step of displaying a scroll arrow for scrolling the list of the image data.

8. The control method according to claim 6, further comprising a step of displaying a list stored in the second memory device.

9. The control method according to claim 6, wherein the list of the image data stored in the first memory device and the list of the image data stored in the second memory are displayed in different display windows.

10. The control method according to claim 9, wherein:
an image data from the list of the image data stored in the first memory device is selected; and
the selected image data is stored in the second memory device if the image data selected by the designator is dragged and dropped onto the list of the image data stored in the second memory device.

11. A non-transitory computer readable storage medium for storing a control method described in claim 6.

12. A system comprising an image pickup device and a display control apparatus connected to the image pickup device, wherein:
the image pickup device comprises:
a first memory device within which image data is stored; and
a first communicator configured to communicate with the display control apparatus, wherein the first communicator sends a signal indicating the image pickup device to the display control apparatus, and
the display control apparatus comprises:
a second communicator configured to communicate with the image pickup device, wherein the second communicator obtains image data stored in the first memory device from the image pickup device if the second communicator receives the signal indicating the image pickup device sent by the first communicator;
wherein the second communicator communicates at a rate according to a device connected to the display control apparatus,
a display controller configured to display an icon indicating the image pickup device together with an icon indicating a second memory device arranged in the display control apparatus if the signal indicating the image pickup device is received by the second communicator, wherein an appearance of the icon indicating the image pickup device differs from an appearance of the icon indicating the second memory device; and
a designator configured to designate the icon indicating the image pickup device, wherein the display controller displays a list of image data stored in the first memory device in the image pickup device if the image pickup device icon is designated by the designator.

13. A display control apparatus connectable to an image pickup device having a first memory device within which image data is stored, comprising:
at least one communicator configured to communicate with the image pickup device, wherein the communicator obtains image data stored in the first memory device if the communicator receives a signal indicating that a device connected to the display control apparatus is the image pickup device;
a display controller configured to display an icon indicating the image pickup device together with an icon indicating a second memory device arranged in the display control apparatus if the signal indicating that a device connected to the display control apparatus is the image pickup device is received by the communicator, wherein an appearance of the icon indicating the image pickup device differs from an appearance of the icon indicating the second memory device; and
a designator configured to designate the icon indicating the image pickup device, wherein the display controller displays representation of contents in the image pickup apparatus if the image pickup device icon is designated by the designator, the contents include the image data stored in the first memory device.

14. The display control apparatus according to claim 13, wherein the display controller displays a scroll arrow for scrolling the representation of contents.

15. The display control apparatus according to claim 13, wherein the display controller displays a list of the representation of contents.

16. The display control apparatus according to claim 13, wherein the display controller displays a list of image data stored in the second memory device.

17. The display control apparatus according to claim 13, wherein the display controller displays a list of the image stored in the first memory device.

18. The display control apparatus according to claim 16, wherein the display controller displays a list of the image data stored in the first memory device and a list of the image data stored in the second memory in different display windows.

19. The display control apparatus according to claim 18, wherein:
the designator can select image data from the list of the image data stored in the first memory device; and
the image data selected by the designator is stored in the second memory device if the image data selected by the designator is dragged and dropped onto the list of the image data stored in the second memory device.

20. A method for controlling a display control apparatus connectable to an image pickup device having a first memory device within which image data is stored, comprising steps of:
obtaining image data stored in the first memory device from the display control apparatus if a signal indicating that a device connected to the display control apparatus is the image pickup device is received;
displaying an icon indicating the image pickup device together with an icon indicating a second memory device arranged in the display control apparatus if the signal indicating a device connected to the display control apparatus is the image pickup device is received, wherein an appearance of the icon indicating the image pickup device differs from an appearance of the icon indicating the second memory device; and
designating the image pickup device icon, wherein representation of contents in the image pickup apparatus is displayed if the image pickup icon is designated by the designator, the contents include the image data stored in the first memory device.

21. The control method according to claim 20, further comprising a step of displaying a scroll arrow for scrolling the representation of contents.

22. The control method according to claim 20, further comprising a step of displaying a list of the representation of contents.

23. The control method according to claim 20, further comprising a step of displaying a list of image data stored in the second memory device.

24. The control method according to claim 20, further comprising a step of displaying a list of the image stored in the first memory device.

25. The control method to claim 23, wherein a list of the image data stored in the first memory device and a list of the image data stored in the second memory are displayed in different display windows.

26. The control method according to claim 25, wherein:
image data from the list of the image data stored in the first memory device is selected; and
the selected image data is stored in the second memory device if the selected image data is dragged and dropped onto the list of the image data stored in the second memory device.

27. A non-transitory computer readable storage medium for storing a control method described in claim 20.

28. A display control apparatus connectable to an image pickup device having a first memory device within which image data is stored, comprising:
at least one communicator configured to communicate with the image pickup device, wherein the communicator obtains image data stored in the first memory device if the communicator receives a signal indicating that a device connected to the display control apparatus is the image pickup device;
a display controller configured to display an icon indicating the image pickup device together with an icon indicating a second memory device arranged in the display control apparatus if the signal indicating that a device connected to the display control apparatus is the image pickup device is received by the communicator, wherein an appearance of the icon indicating the image pickup device differs from an appearance of the icon indicating the second memory device; and
a designator configured to designate the icon indicating the image pickup device, wherein the display controller displays predetermined information for accessing the image data stored in the first memory device if the image pickup device icon is designated by the designator.

29. The display control apparatus according to claim 28, wherein the predetermined information indicates the image stored in the first memory device.

30. The display control apparatus according to claim 28, wherein the display controller displays a list of the predetermined information.

31. The display control apparatus according to claim 28, wherein the communicator obtains image data stored in the first memory device if a predetermined operation is performed to the predetermined information.

32. The display control apparatus according to claim 28, wherein the display controller displays a scroll arrow for scrolling the predetermined information.

33. The display control apparatus according to claim 28, wherein the display controller displays a list of image data stored in the second memory device.

34. The display control apparatus according to claim 28, wherein the display controller displays a list of the image stored in the first memory device.

35. The display control apparatus according to claim 28, wherein the display controller displays a list of the image data stored in the first memory device and a list of the image data stored in the second memory in different display windows.

36. The display control apparatus according to claim 28, wherein:
the designator can select image data from the list of the image data stored in the first memory device; and
the image data selected by the designator is stored in the second memory device if the image data selected by the designator is dragged and dropped onto the list of the image data stored in the second memory device.

37. A method for controlling a display control apparatus connectable to an image pickup device having a first memory device within which image data is stored, comprising steps of:
obtaining image data stored in the first memory device from the display control apparatus if a signal indicating that a device connected to the display control apparatus is the image pickup device is received;
displaying an icon indicating the image pickup device together with an icon indicating a second memory device arranged in the display control apparatus if the signal indicating a device connected to the display control apparatus is the image pickup device is received, wherein an appearance of the icon indicating the image pickup device differs from an appearance of the icon indicating the second memory device; and designating the image pickup device icon, wherein predetermined information for accessing the image data stored in the first memory device is displayed if the image pickup icon is designated by the designator.

38. The control method according to claim 37, wherein the predetermined information indicates the image stored in the first memory device.

39. The control method according to claim 37, further comprising a step of displaying a list of the predetermined information.

40. The control method according to claim 37, further comprising a step of obtaining image data stored in the first memory device if a predetermined operation is performed to the predetermined information.

41. The control method according to claim 37, further comprising a step of displaying a scroll arrow for scrolling the predetermined information.

42. The control method according to claim 37, further comprising a step of displaying a list of image data stored in the second memory device.

43. The control method according to claim 37, further comprising a step of displaying a list of the image stored in the first memory device.

44. The control method according to claim 37, further comprising a step of displaying a list of the image data stored in the first memory device and a list of the image data stored in the second memory in different display windows.

45. The control method according to claim 37, wherein:
an image data from the list of the image data stored in the first memory device is selected; and
the selected image data is stored in the second memory device if the image data selected by the designator is dragged and dropped onto the list of the image data stored in the second memory device.

46. A non-transitory computer readable storage medium for storing a control method described in claim 37.

47. A display control apparatus connectable to an image pickup device having a first memory device within which image data is stored, comprising:
at least one communicator configured to communicate with the image pickup device, wherein the communicator obtains image data stored in the first memory device if the communicator receives a signal indicating that a device connected to the display control apparatus is the image pickup device, wherein the communicator communicates at a rate according to a device connected to the display control device;
a display controller configured to display an icon indicating the image pickup device together with an icon indicating a second memory device arranged in the display control apparatus if the signal indicating that a device connected to the display control apparatus is the image pickup device is received by the communicator, wherein an appearance of the icon indicating the image pickup device differs from an appearance of the icon indicating the second memory device; and
a designator configured to designate the icon indicating the image pickup device, wherein the display controller displays a list of image data stored in the first memory device in the image pickup device after the image pickup device icon is designated by the designator.

48. The display control apparatus according to claim 47, wherein the display controller displays a scroll arrow for scrolling the list of the image data.

49. The display control apparatus according to claim 48, wherein the display controller displays a list stored in the second memory device.

50. The display control apparatus according to claim 49, wherein the display controller displays the list of the image data stored in the first memory device and the list of the image data stored in the second memory in different display windows.

51. The display control apparatus according to claim 50, wherein:
the designator can select an image data from the list of the image data stored in the first memory device; and
the image data selected by the designator is stored in the second memory device if the image data selected by the designator is dragged and dropped onto the list of the image data stored in the second memory device.

52. A method for controlling a display control apparatus connectable to an image pickup device having a first memory device within which image data is stored, comprising steps of:
obtaining image data stored in the first memory device from the display control apparatus if a signal indicating that a device connected to the display control apparatus is the image pickup device is received;
displaying an icon indicating the image pickup device together with an icon indicating a second memory device arranged in the display control apparatus if the signal indicating a device connected to the display control apparatus is the image pickup device is received, wherein an appearance of the icon indicating the image pickup device differs from an appearance of the icon indicating the second memory device; and
designating the image pickup device icon, wherein a list of image data stored in the first memory device arranged in the image pickup device is displayed after the image pickup icon is designated by the designator;
wherein the display control apparatus communicates at a rate according to a device connected to the display control device.

53. The control method according to claim 52, further comprising a step of displaying a scroll arrow for scrolling the list of the image data.

54. A non-transitory computer readable storage medium for storing a control method described in claim 52.

* * * * *